United States Patent
McLaughlin

(10) Patent No.: US 11,448,829 B2
(45) Date of Patent: Sep. 20, 2022

(54) M×N WAVELENGTH SELECTIVE SWITCH WITH COMPRESSED PORT SPACING

(71) Applicant: Lumentum Operations LLC, San Jose, CA (US)

(72) Inventor: Sheldon McLaughlin, Ottawa (CA)

(73) Assignee: Lumentum Operations LLC, San Jose, CA (US)

(*) Notice: Subject to any disclaimer, the term of this patent is extended or adjusted under 35 U.S.C. 154(b) by 107 days.

(21) Appl. No.: 16/947,855

(22) Filed: Aug. 20, 2020

(65) Prior Publication Data
US 2021/0356674 A1  Nov. 18, 2021

Related U.S. Application Data

(60) Provisional application No. 63/023,333, filed on May 12, 2020.

(51) Int. Cl.
*G02B 6/35* (2006.01)
*G02B 6/293* (2006.01)

(52) U.S. Cl.
CPC ....... *G02B 6/3546* (2013.01); *G02B 6/29383* (2013.01); *G02B 6/3518* (2013.01); *G02B 6/3524* (2013.01); *G02B 6/3534* (2013.01)

(58) Field of Classification Search
CPC .. G02B 6/3546; G02B 6/3518; G02B 6/3524; G02B 6/3534; G02B 6/29383; G02B 6/356; G02B 6/2931; G02B 6/3512; G02B 6/3556
See application file for complete search history.

(56) References Cited

U.S. PATENT DOCUMENTS

| | | | |
|---|---|---|---|
| 8,045,854 B2 | 10/2011 | Colbourne | |
| 8,300,995 B2 | 10/2012 | Colbourne | |
| 9,288,559 B2* | 3/2016 | Frisken | G02B 6/356 |
| 9,913,008 B1* | 3/2018 | Keyworth | G02B 6/3518 |
| 10,135,559 B1* | 11/2018 | Colbourne | G02B 6/272 |
| 10,491,322 B2 | 11/2019 | Robertson et al. | |
| 10,587,936 B2 | 3/2020 | Yang et al. | |

* cited by examiner

*Primary Examiner* — Ryan A Lepisto
*Assistant Examiner* — Erin D Chiem
(74) *Attorney, Agent, or Firm* — Harrity & Harrity, LLP

(57) ABSTRACT

An M×N wavelength selective switch (WSS), may comprise a common port fiber array unit (FAU) configured to emit optical beams with a lateral offset and a beam steering device configured to direct optical beams with an angular offset to add/drop port optical fibers of an add/drop port FAU. The common port FAU may comprise a first set of common port optical fibers arranged in a first column of the common port FAU and a second set of common port optical fibers arranged in a second column of the common port FAU. The second column of the common port FAU may be laterally offset from the first column of the common port FAU. The beam steering device may be configured to selectively direct, in two dimensions, the optical beams with the angular offset to the add/drop port optical fibers.

20 Claims, 9 Drawing Sheets

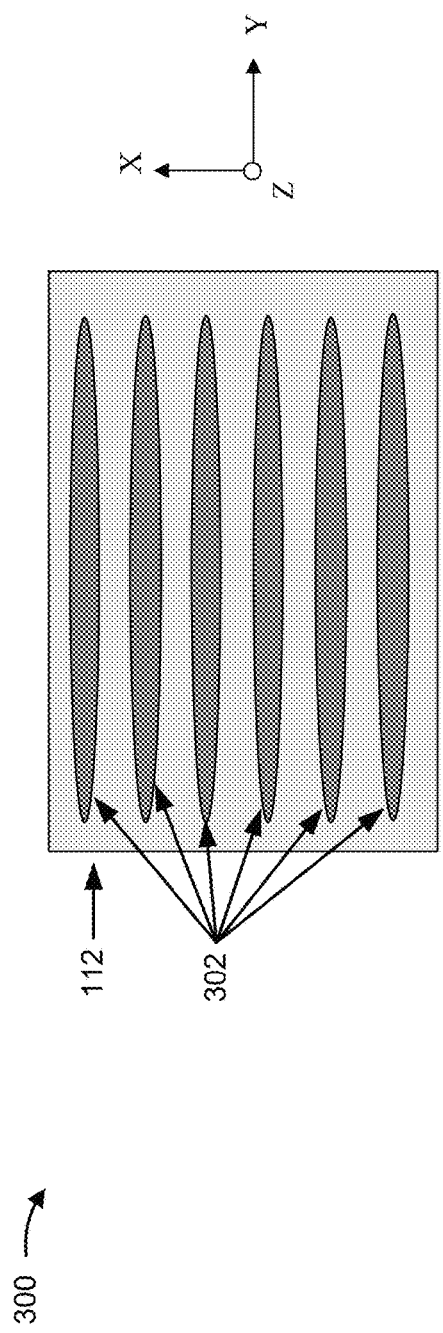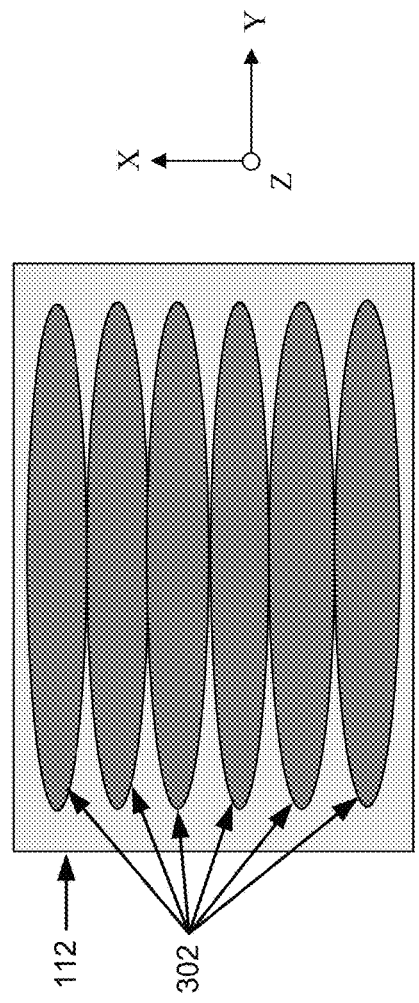

M×N WAVELENGTH SELECTIVE SWITCH WITH COMPRESSED PORT SPACING

RELATED APPLICATION

This application claims priority to U.S. Provisional Patent Application No. 63/023,333, filed on May 12, 2020, and entitled "M×N WAVELENGTH SELECTIVE SWITCH WITH COMPRESSED PORT SPACING," the content of which is incorporated by reference herein in its entirety.

TECHNICAL FIELD

The present invention relates to optical switch devices, and to wavelength selective optical switch devices having a plurality of input and output port optical fibers.

BACKGROUND

In an optical communication network, optical signals having a plurality of optical channels at individual wavelengths (typically called "wavelength channels") are transmitted from one location to another, typically through a length of optical fiber. An optical cross-connect module allows switching of optical signals from one optical fiber to another. A wavelength selective switch (WSS) provides reconfigurable wavelength-dependent switching that allows certain wavelength channels to be switched from a first optical fiber to a second optical fiber while letting other wavelength channels propagate in the first optical fiber.

SUMMARY

In some implementations, an M×N WSS includes a common port fiber array unit (FAU) configured to emit optical beams with a lateral offset, comprising: a first set of common port optical fibers arranged in a first column of the common port FAU, and a second set of common port optical fibers arranged in a second column of the common port FAU, wherein the second column of the common port FAU is laterally offset from the first column of the common port FAU; and a beam steering device configured to direct optical beams with an angular offset to add/drop port optical fibers, wherein the beam steering device is configured to selectively direct, in two dimensions, the optical beams with the angular offset to the add/drop port optical fibers.

In some implementations, an M×N WSS includes a common port FAU, comprising: a first set of common port optical fibers and a second set of common port optical fibers arranged in a one-dimensional linear array of the common FAU, wherein the first set of common port optical fibers and the second set of common port optical fibers are positioned alternatingly in the one-dimensional linear array of the common FAU; a microlens array (MLA) coupled to the common port FAU, comprising: a first set of microlenses and a second set of microlenses arranged in a one-dimensional linear array of the MLA, wherein the first set of microlenses and the second set of microlenses are arranged in an alternating lateral offset pattern in the one-dimensional linear array of the MLA, and wherein the first set of microlenses are coupled to the first set of common port optical fibers and the second set of microlenses are coupled to the second set of common port optical fibers; and a beam steering device configured to selectively direct angularly offset optical beams to add/drop port optical fibers of an add/drop port FAU.

In some implementations, an M×N WSS includes a laterally offset microcollimator array (MCA), comprising: a one-dimensional FAU coupled to a laterally offset one-dimensional MLA, or a laterally offset two-dimensional FAU coupled to a laterally offset two-dimensional MLA; and a beam steering device, comprising: one or more elements for selectively directing angularly offset optical beams to or from the laterally offset MCA in two dimensions.

BRIEF DESCRIPTION OF THE DRAWINGS

FIGS. 3A-3B are example diagrams of optical beams projected on a second beam steering device of the conventional M×N WSS described herein.

DETAILED DESCRIPTION

The following detailed description of example implementations refers to the accompanying drawings. The same reference numbers in different drawings may identify the same or similar elements.

Figure 1:
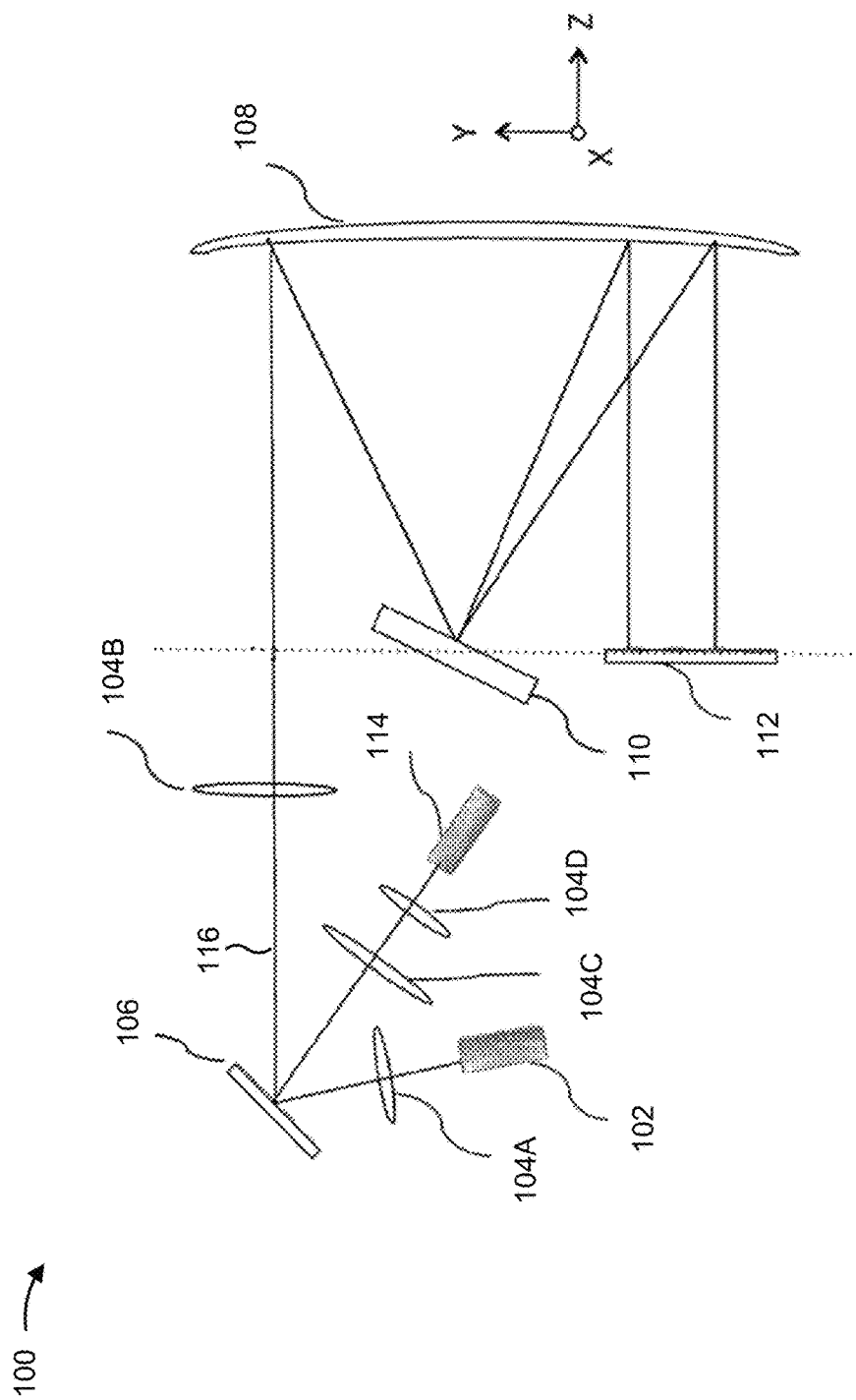
FIG. 1 is a diagram illustrating a top view of an example layout of a conventional M×N WSS described herein.

A conventional M×N WSS (e.g., as shown in FIG. 1) may transmit optical beams from common port optical fibers of an input FAU common port optical fiber to add/drop optical fibers of an output FAU of the conventional M×N WSS. To do so, the optical beams may be projected onto a beam steering device as spectrally dispersed beams. Positions of the spectrally dispersed beams may be correlated with positions of respective common port optical fibers of the input FAU that generate the optical beams. Accordingly, when the common port optical fibers of the input FAU are spaced closely together, the spectrally dispersed beams may overlap on the beam steering device. This may cause adjacent beams of the spectrally dispersed beams to interfere with each other, which may create crosstalk between signal paths associated with the adjacent beams. Accordingly, this may affect an ability of the conventional M×N WSS to have compressed port spacing (e.g., to fit in a small form factor) and still provide a robust, error-free functionality.

Figure 5:
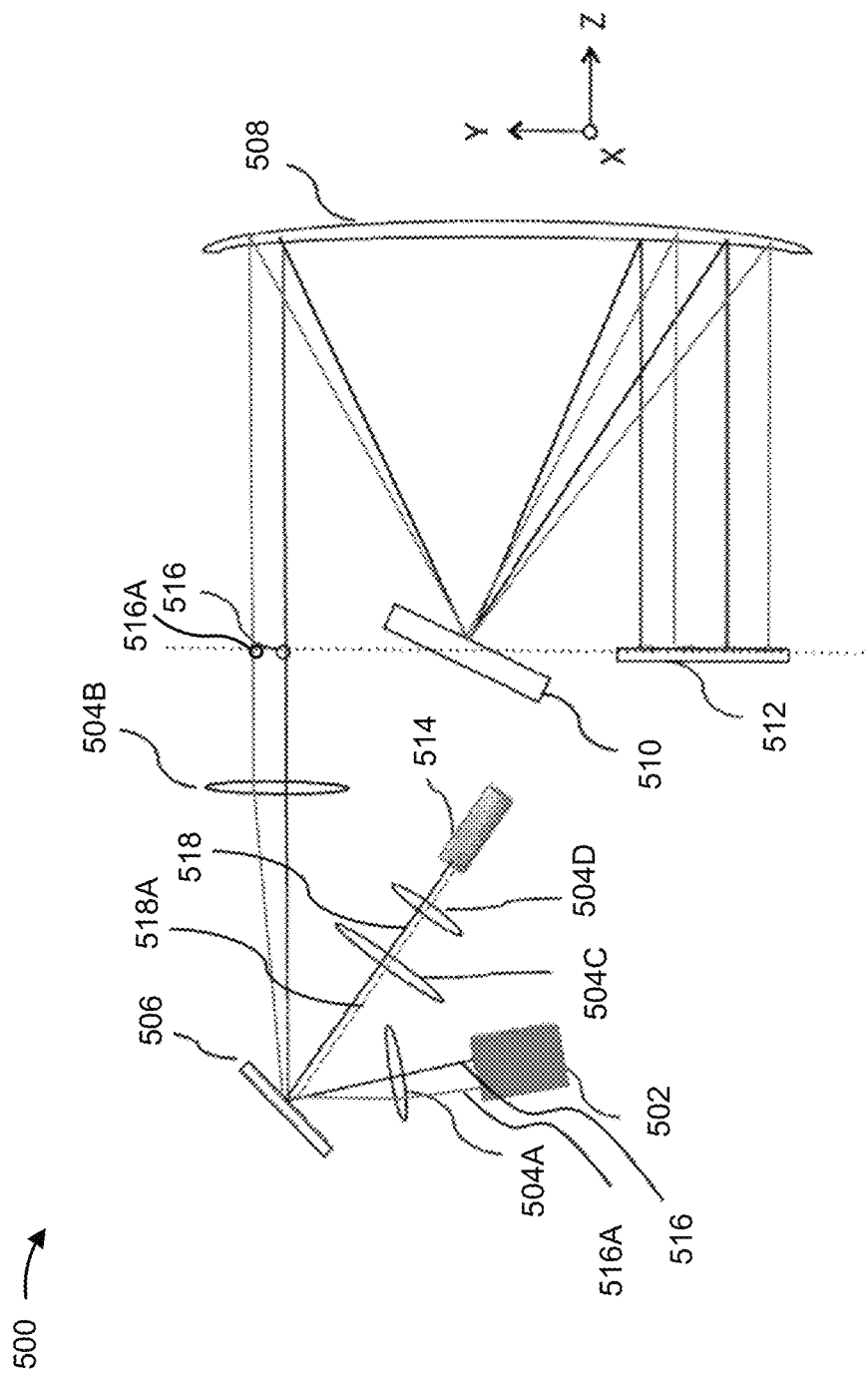
FIG. 5 is a diagram illustrating a top view of a layout of an example M×N WSS described herein.

Some implementations described herein provide an M×N WSS (e.g., as shown in FIG. 5) that includes a laterally offset FAU as an input FAU and/or an output FAU of the M×N WSS. In some implementations, a laterally offset FAU may include a one-dimensional (1D) FAU that (e.g., when coupled to a laterally offset 1D microlens array (MLA)) is configured to emit a first set of optical beams interleaved with a second set of optical beams, wherein the first set of optical beams and the second set of optical beams have an angular offset. In some implementations, a laterally offset FAU may include a laterally offset two-dimensional (2D) FAU that (e.g., when coupled to a laterally offset 2D MLA) is configured to emit optical beams with a lateral offset.

In this way, when the optical beams of the M×N WSS are projected onto a beam steering device of the M×N WSS as spectrally dispersed beams, adjacent beams may be laterally offset from each other. This may reduce and/or eliminate crosstalk between signal paths associated with the adjacent beams when the adjacent beams overlap. Accordingly, common port optical fibers of the input FAU may be spaced more closely together (e.g., compressed) without affecting an ability of the M×N WSS to provide a robust, error-free functionality. This may also allow a form factor of the M×N WSS to be reduced and/or allow the M×N WSS to support more port optical fibers.

FIG. 1 is a diagram illustrating a top view of an example layout 100 of a conventional M×N WSS 100. As shown in FIG. 1, the WSS 100 may include an input fiber array unit (FAU) 102 (e.g., comprising an array of common port optical fibers), a lens 104A, a lens 104B, a lens 104C, a lens 104D, a first beam steering device 106 (e.g., a micro-electromechanical system (MEMS) mirror), a concave mirror 108, a diffraction grating 110 (e.g., disposed on an optical axis of the concave mirror 108), a second beam steering device 112 (e.g., a liquid crystal on substrate (LCOS) phased array beam steering device), and an output FAU 114 (e.g., comprising an array of add/drop port optical fibers). The diffraction grating 110 and the second beam steering device 112 may be disposed at the focal plane (e.g., indicated by the dotted line) of the concave mirror 108.

As further shown in FIG. 1, an optical beam 116 emitted from a common port of the input FAU 102 may be directed to the second beam steering device 112 (e.g., via the lens 104A, the first beam steering device 106, the lens 104B, the concave mirror 108, and the diffraction grating 110). The diffraction grating 110 separates the optical beam 116 into a plurality of sub-beams, where each sub-beam carries a separate wavelength channel, that are dispersed in a plane parallel to the YZ plane. The dispersed wavelength channel sub-beams are coupled by the concave mirror 108 to the second beam steering device 112. More specifically, each wavelength channel sub-beam is incident on a different switching element in one row of the second beam steering device 112. Each switching element reflects each wavelength channel sub-beam (e.g., with a predetermined angle) to an add/drop port of the output FAU 114 (e.g., via the diffraction grating 110, the concave mirror 108, the lens 104, the first beam steering device 106, the lens 104C, and the lens 104D).

As indicated above, FIG. 1 is provided as an example. Other examples may differ from what is described with regard to FIG. 1.

Figure 2:
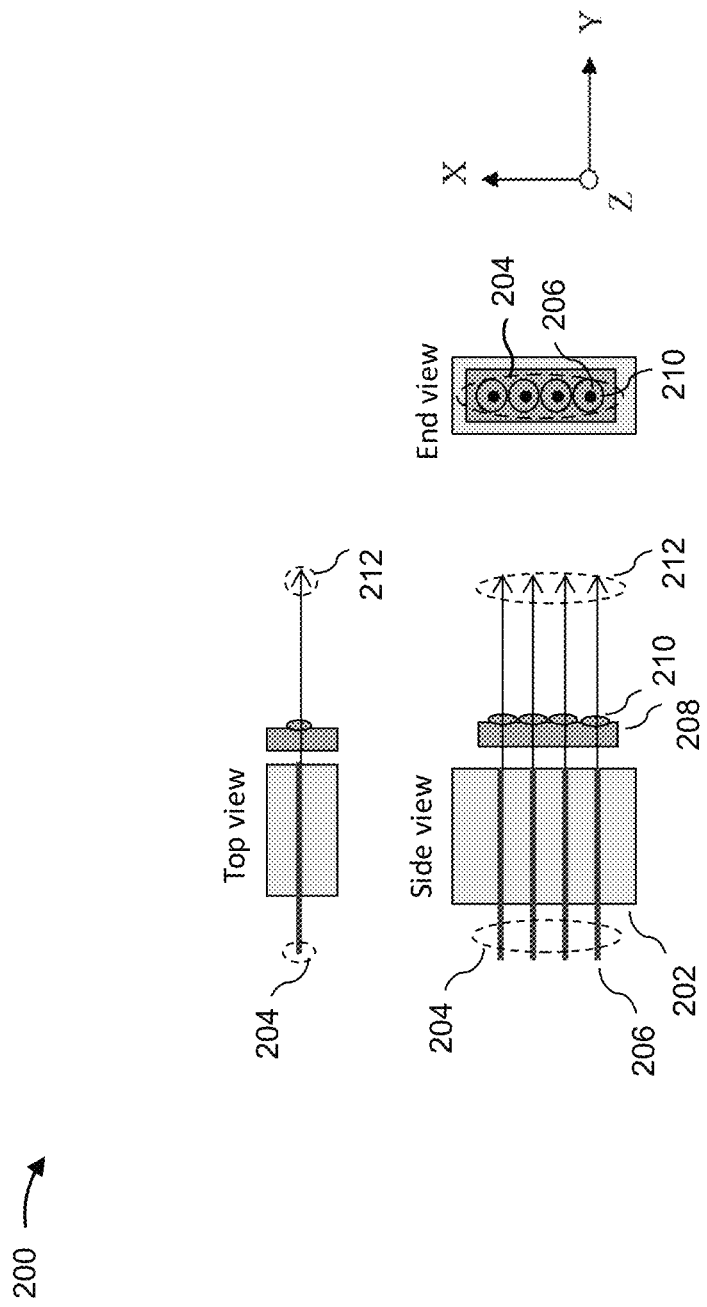
FIG. 2 is a diagram illustrating a top view, a side view, and an end view of an example of a conventional one dimensional (1D) FAU described herein.

FIG. 2 is a diagram illustrating a top view, a side view, and an end view of an example 200 of a conventional one-dimensional (1D) FAU 202, where the XYZ coordinate axis shown in FIG. 2 is associated with the end view. The 1D FAU 202 may correspond to the input FAU 102 and/or the output FAU 114 described herein in relation to FIG. 1. As shown in FIG. 2, the 1D FAU 202 may include an array of port optical fibers 204 comprising a plurality of port optical fibers 206 (e.g., a plurality of common port optical fibers, a plurality of add/drop port optical fibers, and/or the like). The 1D FAU 202 may be coupled to a microlens array (MLA) 208 comprising a plurality of microlenses 210. The 1D FAU 202 may be coupled to the MLA 208 such that a port optical fiber 206, of the array of port optical fibers 204, is associated with a particular microlens 210 of the MLA 208. A combination of the 1D FAU 202 and the MLA 208 is sometimes referred to as a microcollimator array (MCA).

In a typical case, the array of port optical fibers 204 and the MLA 208 may each be arranged in a 1D linear array (e.g., in a column as shown in the end view of the 1D FAU 202). Accordingly, the MCA may collimate diverging light exiting the array of port optical fibers 204 of the 1D FAU 202, resulting in a set of beams 212 exiting the MCA that are parallel to one another.

As indicated above, FIG. 2 is provided as an example. Other examples may differ from what is described with regard to FIG. 2.

FIGS. 3A-3B are example diagrams 300 of optical beams projected on the second beam steering device 112 of the conventional M×N WSS 100. As described herein in relation to FIG. 1, an optical beam emitted from a common port optical fiber of the input FAU 102 may be dispersed into a plurality of wavelength channel sub-beams (e.g., by the diffraction grating 110) that are projected as a spectrally dispersed beam (e.g., in one row) on the second beam steering device 112. As shown in FIG. 3A, a plurality of spectrally dispersed beams 302 (shown as six spectrally dispersed beams) may be projected on the second beam steering device 112 at one time (e.g., contemporaneously). The plurality of spectrally dispersed beams 302 may be respectively associated with a plurality of common port optical fibers of the input FAU 102, and positions of the plurality of spectrally dispersed beam 302 may correspond to positions of the plurality of common port optical fibers in the input FAU 102. For example, when the plurality of common port optical fibers are arranged in a 1D linear array in the input FAU 102 (e.g., as described herein in relation to FIG. 2 and the 1D FAU 202), the plurality of spectrally dispersed beams 302 may also be arranged in a 1D linear array on the second beam steering device 112, as shown in FIG. 3A.

Spacing between two adjacent spectrally dispersed beams 302 on the second beam steering device 112 (e.g., along the X-axis in FIG. 3A) may correspond to spacing between two adjacent corresponding common port optical fibers in the input FAU 102. Accordingly, when spacing between common port optical fibers of the input FAU 102 is reduced (e.g., common port spacing is compressed), the plurality of spectrally dispersed beams 302 associated with the common port optical fibers may be more closely spaced together (e.g., along the X-axis in FIG. 3A) on the beam steering device 312.

In some cases, as shown in FIG. 3B, adjacent beams of the spectrally dispersed beams 302 may overlap each other (e.g., when common port spacing of corresponding common port optical fibers is compressed). This may cause the adjacent beams to interfere with each other, which may create crosstalk between signal paths associated with the adjacent beams. For example, a portion of signals associated with a first common port optical fiber of the input FAU 102 (e.g., a portion of signals associated with the top-most spectrally dispersed beam in FIG. 3B) may leak into paths of signals associated with a second common port optical fiber of the input FAU 102 (e.g., a portion of signals associated with the second-from-top spectrally dispersed beam in FIG. 3B), such that, at an add/drop port optical fiber of the output FAU 114 that is to receive the signals associated with the second common port optical fiber, the portion of signals associated with the first common port optical fiber may be coupled to the signals associated with the second common port optical fiber, which may interfere with the transmission and detection of the signals associated with the second common port optical fiber. A transmission system may be sensitive to such interference because signals associated with the first common port optical fiber, and signals associated with the second common port may be of a same frequency as a channel of a coherent receiver associated with the add/drop port optical fiber. While the coherent receiver may be able to reject interference at frequencies not associated with the channel, the coherent receiver may be incapable of diminishing and/or rejecting interference at the same frequency as the channel. Additionally, or alternatively, the compressed common port spacing may cause an insertion loss due to beam clipping of closely spaced common port optical fibers.

As indicated above, FIGS. 3A-3B are provided as an example. Other examples may differ from what is described with regard to FIGS. 3A-3B.

Figure 4:
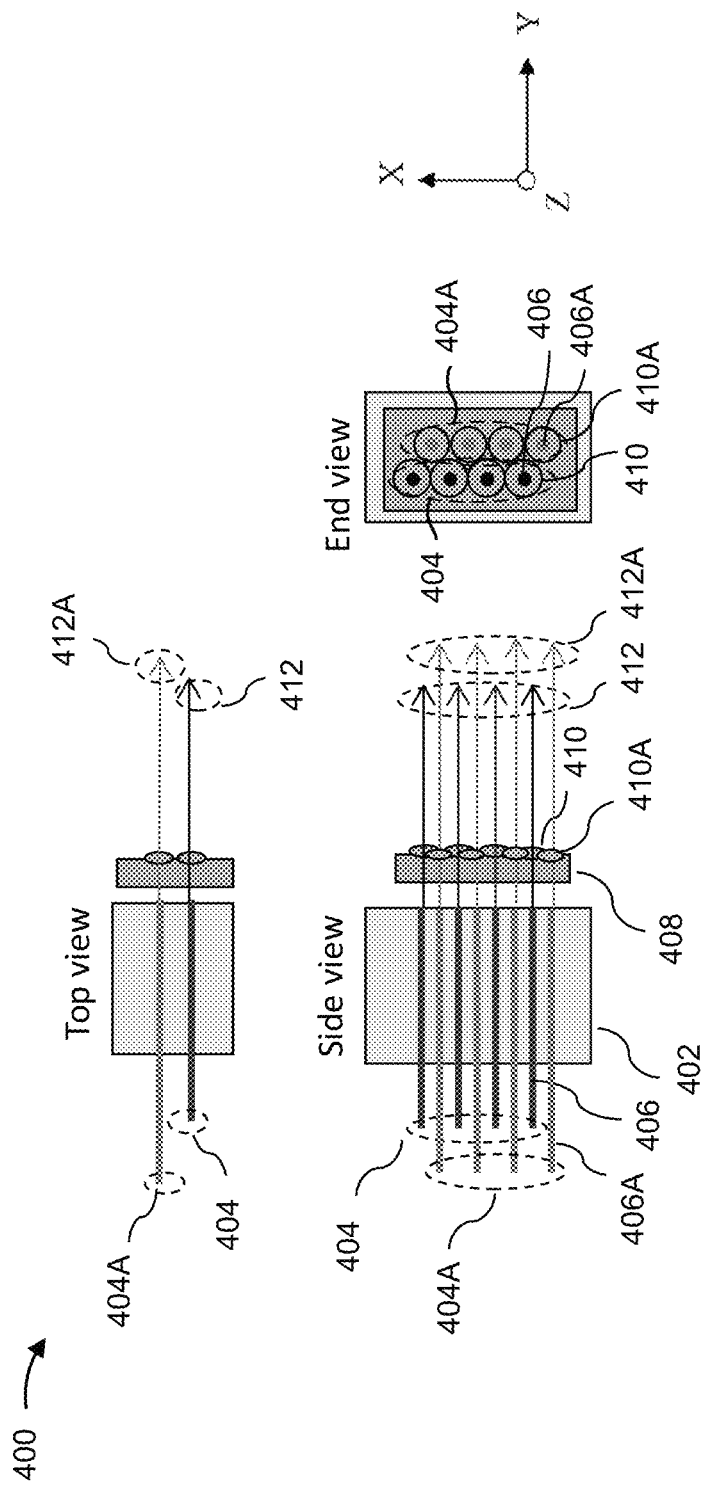
FIG. 4 is a diagram illustrating a top view, a side view, and an end view of an example implementation of a two-dimensional (2D) FAU described herein.

FIG. 4 is a diagram illustrating a top view, a side view, and an end view of an example implementation 400 of a two-dimensional (2D) FAU 402, where the XYZ coordinate axis shown in FIG. 4 is associated with the end view. As shown in FIG. 4, the 2D FAU 402 may include a first array of port optical fibers 404 comprising a plurality of port optical fibers 406 (e.g., a plurality of common port optical fibers, a plurality of add/drop port optical fibers, and/or the like) and a second array of port optical fibers 404A comprising a plurality of port optical fibers 406A (e.g., a plurality of common port optical fibers, a plurality of add/drop port optical fibers, and/or the like). The 2D FAU 402 may be coupled to an MLA 408 comprising a first plurality of microlenses 410 and a second plurality of microlenses 410A. The 2D FAU 402 may be coupled to the MLA 408 such that a port optical fiber 406, of the first array of port optical fibers 404, is associated with a particular microlens 410 of the MLA 408 and a port optical fiber 406A, of the second array of port optical fibers 404A, is associated with a particular microlens 410A of the MLA 408.

The first array of port optical fibers 404 and the second array of port optical fibers 404A may be arranged in respective 1D linear arrays (e.g., in columns as shown in the end view of the 2D FAU 402), to make a 2D array of port optical fibers in the 2D FAU 402. The first plurality of microlenses 410 and the second plurality of microlenses 410A may be correspondingly arranged (e.g., in columns as shown in the end view of the 2D FAU 402) in the MLA 408.

As shown in the top view and the end view of the 2D FAU 402 in FIG. 4, the second array of port optical fibers 404A may be laterally offset (e.g., along the Y-axis in FIG. 4) and run next to (e.g., in parallel with) the first array of port optical fibers 404 through the 2D FAU 402. As shown in the end view of 2D FAU 402 in FIG. 4, the second array of port optical fibers 404A also may be laterally offset (e.g., along the X-axis in FIG. 4) from the first array of port optical fibers 404. For example, the second array of port optical fibers 404A may be laterally offset by an amount equal to half an amount of spacing between two adjacent port optical fibers 406 (e.g., along the X-axis in FIG. 4). The first plurality of microlenses 410 and the second plurality of microlenses 410A may be correspondingly arranged (e.g., the second plurality of microlenses 410A may be arranged next to and/or laterally offset from the first plurality of microlenses 410) in the MLA 408. Accordingly, a combination of the 2D FAU 402 and the MLA 408 may be referred to as a laterally offset 2D MCA.

In some implementations, the 2D MCA may collimate diverging light exiting the first array of port optical fibers 404 and diverging light exiting the second array of port optical fibers 404A of the 2D FAU 402, resulting in a first set of optical beams 412 (e.g., associated with the light exiting the first array of port optical fibers 404) and a second set of optical beams 412A (e.g., associated with light exiting the second array of port optical fibers 404A) exiting the 2D MCA that are parallel to one another, but where the second set of optical beams 412A are offset (e.g., in the lateral direction) from the first set of optical beams 412.

As indicated above, FIG. 4 is provided as an example. Other examples may differ from what is described with regard to FIG. 4.

FIG. 5 is a diagram illustrating a top view of a layout of an example M×N WSS 500. As shown in FIG. 5, the M×N WSS 500 may include a 2D input FAU 502 (e.g., that corresponds to the 2D FAU 402 and/or comprises a 2D array of common port optical fibers), a lens 504A, a lens 504B, a lens 504C, a lens 504D, a first beam steering device 506 (e.g., a MEMS mirror array), a concave mirror 508, a diffraction grating 510 (e.g., disposed on an optical axis of the concave mirror 508), a second beam steering device 512 (e.g., an LCOS phased array beam steering device), and a 1D output FAU 514 (e.g., that corresponds to the 1D FAU 202 and/or comprises a 1D array of add/drop port optical fibers). The diffraction grating 510 and the second beam steering device 512 may be disposed at the focal plane (e.g., indicated by the dotted line) of the concave mirror 508. In some implementations, an MLA (e.g., the MLA 408) may be coupled to the 2D input FAU 502, but is not shown in FIG. 5 (e.g., for simplicity).

As further shown in FIG. 5, a first optical beam 516 and a second optical beam 516A may be emitted from the 2D input FAU 502 in parallel but with a YZ lateral offset (e.g., within the YZ plane) from each other. The lens 504A (e.g., an offset-to-angle lens) may converge the first optical beam 516 and the second optical beam 516A to a same area of the first beam steering device 506 (e.g., a first particular mirror of the MEMS mirror array), thereby converting the YZ lateral offset associated with the 2D input FAU 502 to an angular offset at the first beam steering device 506.

The first beam steering device 506 may direct the first optical beam 516 and the second optical beam 516A to the lens 504B (e.g., an angle-to-offset lens) that may convert the angular offset to a Y-direction lateral offset (e.g., along the Y-axis) at an intermediate plane, such as the focal plane (e.g., indicated by the dotted line) of the concave mirror 508. The concave mirror 508 may direct the first optical beam 516 and the second optical beam 516A to the diffraction grating 510, which may respectively separate each optical beam into a plurality of sub-beams, where each sub-beam carries a separate wavelength channel, and where the plurality of sub-beams are dispersed in a plane parallel to the YZ plane.

The dispersed wavelength channel sub-beams of each optical beam are coupled by the concave mirror 508 to the second beam steering device 512. More specifically, each wavelength channel sub-beam of an optical beam is incident on a different switching element in one row of the second beam steering device 512. For example, the dispersed wavelength channel sub-beams of the first optical beam 516 may be projected on a first row of switch elements of the second beam steering device 512 and the dispersed wavelength channel sub-beams of the second optical beam 516A may be projected on a second row of switch elements of the second beam steering device 512. Moreover, respective positions of the dispersed wavelength channel sub-beams of the second optical beam 516A on the second row of switch elements may be at a lateral offset (e.g., along the Y-axis) to corresponding respective positions of the dispersed wavelength channel sub-beams of the first optical beam 516 on the first row (e.g., based on the Y-direction lateral offset). This is described in further detail herein in relation to FIG. 9.

The second beam steering device 512 may then reflect the dispersed wavelength channel sub-beams of each optical beam to the diffraction grating 510 (e.g., via the concave mirror 508), which may combine the dispersed wavelength channel sub-beams into a single optical beam, such as into the first optical beam 516 or the second optical beam 516A. The diffraction grating 510 may then direct the first optical beam 516 and the second optical beam 516A to the concave mirror 508, which may reintroduce the Y-direction lateral offset between the optical beams (e.g., as shown at the intermediate plane) and may direct the optical beams to the lens 504B. The lens 504B may converge the first optical beam 516 and the second optical beam 516A to a same area of the first beam steering device 506 (e.g., a second particular mirror of the MEMS mirror array) at an angle in the YZ plane (e.g., that corresponds to the Y-direction lateral offset).

The first beam steering device 506 may include a plurality of tiltable mirrors (e.g., a plurality of MEMS mirrors tiltable around the X-axis and/or the Y-axis), where each tiltable mirror corresponds to an add/drop port optical fiber of the 1D output FAU 514. The lenses 504C and 504D may form a magnifying system that images beam positions at the first beam steering device 506 to beam positions at the array of add/drop port optical fibers of the 1D output FAU 514 and/or that images beam angles at the first beam steering device 506 to beam angles at the array of add/drop port optical fibers of the 1D output FAU 514. Further, a mirror of the first beam steering device 506 (e.g., a MEMS mirror) may be enabled to tilt (e.g., around the X-axis and/or another axis), which may allow an angle of incidence of an optical beam reflected by the mirror to be adjusted toward an add/drop port optical fiber of the 2D output FAU 514.

As further shown in FIG. 5, a mirror of the first beam steering device 506 (e.g., the second particular mirror of the MEMS mirror array) may be tilted (e.g., around the X-axis and/or the Y-axis) so that a first ray path 518 (corresponding to the first optical beam 516) is angled to couple into a first particular add/drop port optical fiber of the 1D output FAU 514, and/or a second ray path 518A (corresponding to the second optical beam 516A) is angled to couple into a second particular add/drop port optical fiber of the 1D output FAU 514. Accordingly, the first beam steering device may direct (e.g., via the first ray path 518) the first optical beam 516 to the first particular add/drop port optical fiber of the 1D output FAU 514, and/or may direct (e.g., via the second ray path 518A) the second optical beam 516A to the second particular add/drop port optical fiber of the 1D output FAU 514.

In some implementations, the mirror of the first beam steering device 506 may be tilted (e.g., around the X-axis and/or the Y-axis) so that a ray path arrives at an angle of incidence to a particular add/drop port optical fiber of the 1D output FAU 514 that prevents efficient coupling and therefore a corresponding optical beam associated with the ray path is rejected by the particular add/drop port optical fiber.

As indicated above, FIG. 5 is provided as an example. Other examples may differ from what is described with regard to FIG. 5.

Figures 6A, 6B:
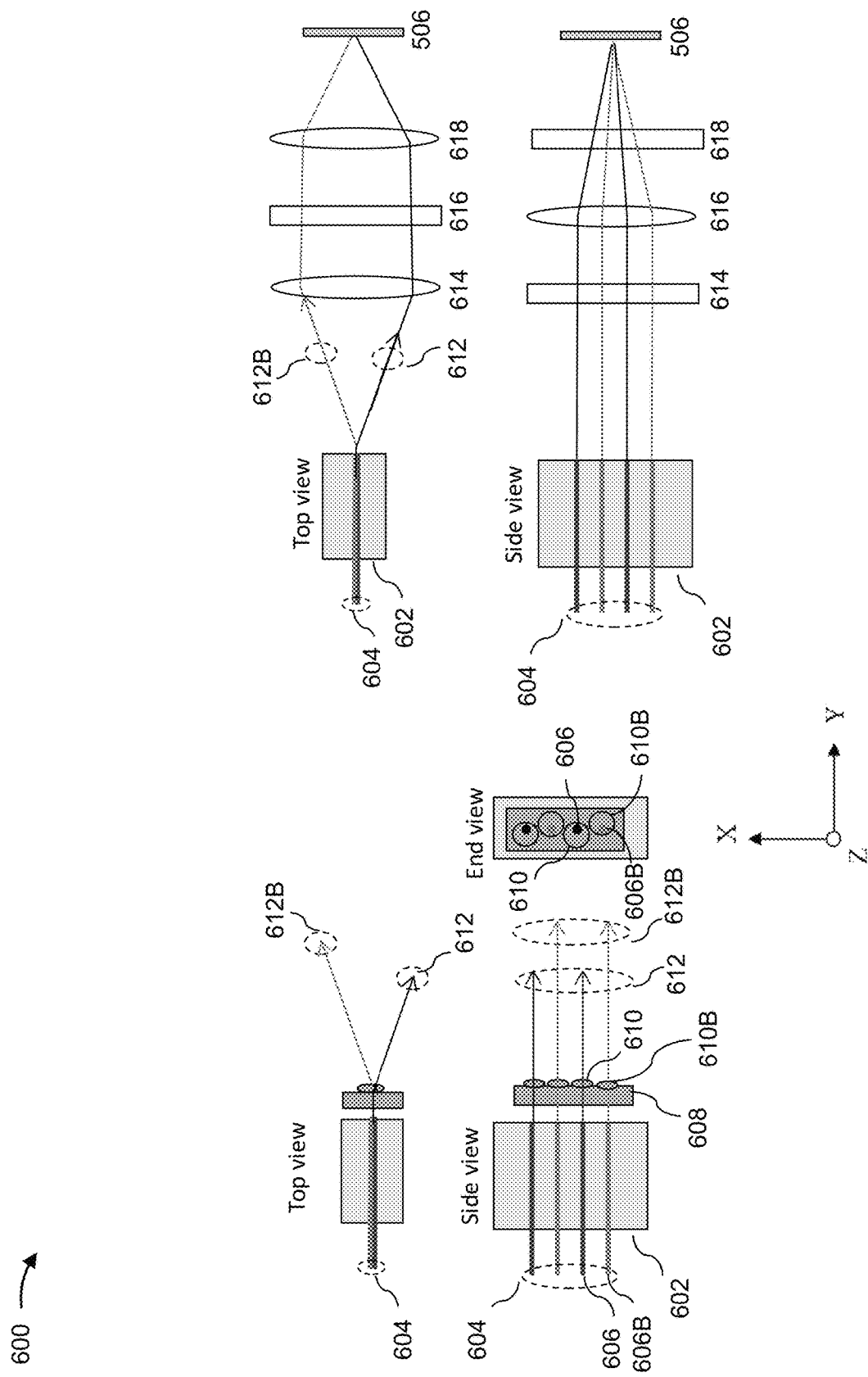
FIGS. 6A and 6B are diagrams illustrating a top view, a side view, and an end view of an example implementation of a 1D FAU described herein.

FIGS. 6A and 6B are diagrams illustrating a top view, a side view, and an end view of an example implementation 600 of a one-dimensional (1D) FAU 602, where the XYZ coordinate axis shown in FIG. 6A is associated with the end view. As shown in FIG. 6A, the 1D FAU 602 may include an array of port optical fibers 604 comprising a plurality of port optical fibers 606 and a plurality of port optical fibers 606B (e.g., a plurality of common port optical fibers, a plurality of add/drop port optical fibers, and/or the like). The array of port optical fibers 604 may be arranged in a 1D linear array (e.g., in a column as shown in the end view of the 1D FAU 602 in FIG. 6A) in an alternating port pattern, where a first port optical fiber 606 is arranged above a first port optical fiber 606B, which is arranged above a second port optical fiber 606, which is arranged above a second port optical fiber 606B, which is arranged above a third port optical fiber 606, and so on.

In some implementations, the 1D FAU 602 may be coupled to an MLA 608 comprising a plurality of microlenses 610 and a plurality of micro lenses 610B. The MLA 608 may be arranged in a 1D linear array (e.g., in a column as shown in the end view of the 1D FAU 602 in FIG. 6A) in an alternating, lateral offset microlens pattern, where: a first microlens 610 is arranged above a first microlens 610B and the first microlens 610B is laterally offset from the first microlens 610 (e.g., in the positive Y direction); the first microlens 610B is arranged above a second microlens 610 and the second microlens 610 is laterally offset from the first microlens 610B (e.g., in the negative Y direction); the second microlens 610 is arranged above a second microlens 610B and the second microlens 610B is laterally offset from the second microlens 610 (e.g., in the positive Y direction); the second microlens 610B is arranged above a third microlens 610 and the third microlens 610 is laterally offset from the second microlens 610B (e.g., in the negative Y direction); and so on.

The array of port optical fibers 604 of the 1D FAU 602 may be coupled to the MLA 608 such that a port optical fiber 606, of the array of port optical fibers 604, is associated with a particular microlens 610 of the MLA 608, and/or a port optical fiber 606B, of the array of port optical fibers 604, is associated with a particular microlens 610B of the MLA 608. Accordingly, a combination of the 1D FAU 602 and the MLA 608 may be referred to as a laterally offset 1D MCA.

As shown in the end view of the 1D FAU 602 shown in FIG. 6A, center positions of the plurality of port optical fibers 606 may not align with optical axes of the plurality of microlenses 610, and/or center positions of the plurality of port optical fibers 606B may not align with optical axes of the plurality of microlenses 610B. Accordingly, as further shown in FIG. 6A, a first set of optical beams 612 (e.g., associated with the plurality of port optical fibers 606 and the plurality of microlenses 610) and a second set of optical beams 612 B (e.g., associated with the plurality of port optical fibers 606B and the plurality of microlenses 610B) may exit the 1D offset MCA at divergent angles (e.g., not parallel to each other). The first set of optical beams 612 and the second set of optical beams 612B may be interleaved (e.g., as shown in the side view of the 1D FAU 602 shown in FIG. 6A) and/or may have an angular offset (e.g., as shown in the top view of the 1D FAU 602 shown in FIG. 6A).

Accordingly, because the first set of optical beams 612 and the second set of optical beams have an angular offset (e.g., instead of a lateral position offset, as described herein in relation to optical beams associated with the 2D FAU 402 and/or the 2D input FAU 502 in FIGS. 4 and 5), some optics may need to be modified when the 1D FAU 602 is the input FAU of the M×N WSS 500 described in FIG. 5.

FIG. 6B shows an example input optical path that may replace a portion of the input optical path before the first beam steering device 506 shown in FIG. 5. In some implementations, an MLA (e.g., the MLA 608) may be coupled to the 1D FAU 602, but is not shown in FIG. 6 (e.g., for simplicity). As shown in FIG. 6B, optics of the M×N WSS 500 may be modified to allow the first set of optical beams 612 and the second set of optical beams 612B to be emitted from the 1D FAU 602 and converge to a same area of the first beam steering device 506 (e.g., to provide similar functionality as described herein in relation to FIG. 5). To achieve such a convergence, offset in the X-direction at 602 may be transformed to angle in the XZ plane at 506, and beam angle in the YZ plane at 602 may be transformed to beam angle in the YZ plane at 506. Accordingly, the lens 504A (e.g., as described in FIG. 5) may be replaced by a lens 614, a lens 616, and/or a lens 618.

In some implementations, the lens 614 and the lens 618 may each be a cylindrical lens having power in the top view plane of the M×N WSS 500 and lens 616 may be a cylindrical lens having power in the side view plane of the M×N WSS 500. The lens 614 and the lens 618 may be configured to reimage the 1D FAU 602 output at the first beam steering device 506 in the top view plane, which may converge the first set of optical beams 612 and the second set of optical beams 612B to the same area of the first beam steering device 506. In the side view plane, the lens 616 may be configured to convert lateral offset at the 1D FAU 602 to angular offset at the first beam steering device 506, which may converge the first set of optical beams 612 and the second set of optical beams 612B to the same area of the first beam steering device 506.

In some implementations, the lens 614 may be separated from the 1D FAU 602 by a focal length of the lens 614. In some implementations, the lens 616 may be separated from the 1D FAU 602 by a focal length of the lens 616, and/or the first beam steering device 506 may be separated from the lens 616 by the focal length of the lens 616. Additionally, or alternatively, the lens 618 may be separated from the lens 614 by a sum of the focal length of the lens 614 and a focal length of the lens 618. In some implementations, the first beam steering device 506 may be separated from the lens 618 by the focal length of the lens 618.

In some implementations, the example optical path shown in FIG. 6B, after the first beam steering device 506, may be similar to the optical path shown in FIG. 5.

As indicated above, FIGS. 6A-6B are provided as an example. Other examples may differ from what is described with regard to FIGS. 6A-6B.

Figure 7:
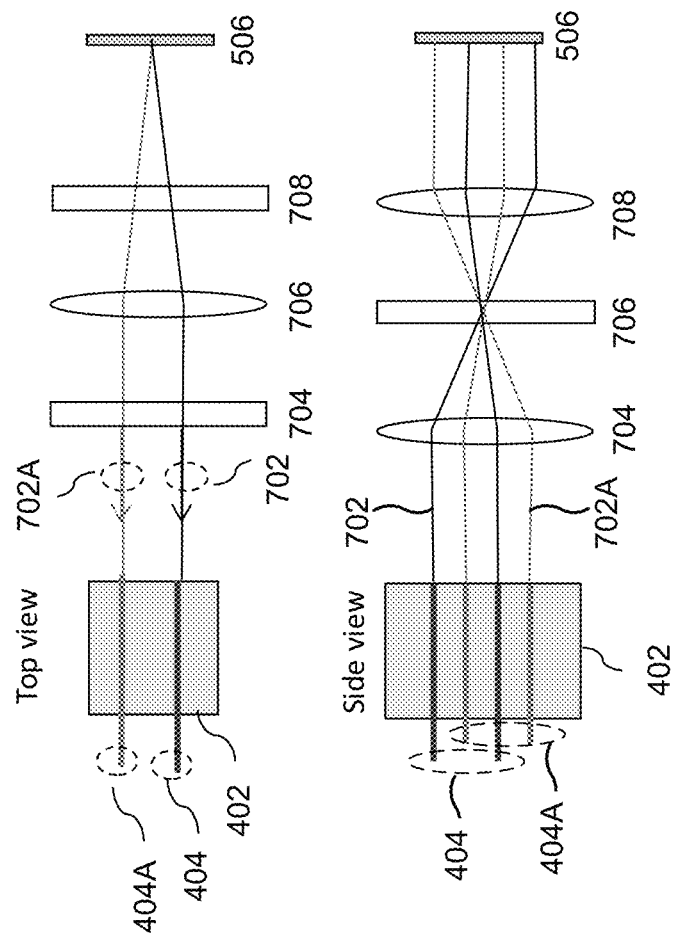
FIG. 7 is a diagram illustrating an example optical path that may replace a portion of the output optical path of the example M×N WSS described herein.

FIG. 7 shows an example optical path that may replace a portion of the output optical path of the M×N WSS 500 shown in FIG. 5 when the 1D output FAU 514 is replaced with the 2D FAU 402. As shown in FIG. 7, optics of the M×N WSS 500 may be modified to allow a first set of optical beams 702 and a second set of optical beams 702A to be respectively transmitted from the first beam steering device 506 to the first array of port optical fibers 404 (e.g., add/drop port optical fibers) and the second array of port optical fibers 404A (e.g., add/drop port optical fibers) of the 2D FAU 402. To do so, as shown in FIG. 7, an optical beam angle at the first beam steering device 506 in a top view plane of the M×N WSS 500 may be transformed to an optical beam with a lateral offset at the 2D FAU 402, while imaging of vertical offset at the first beam steering device 506 is maintained at the 2D FAU 402 in the side view plane. Accordingly, the lens 504C and the lens 504D may be replaced (e.g., as shown in FIG. 5) with a lens 704, a lens 706, and/or lens 708 as shown in FIG. 7.

In some implementations, the lens 704 and the lens 708 may be cylindrical lenses having optical power in a side view plane of the M×N WSS 500, and the lens 706 may be a cylindrical lens having optical power in a top view plane of the M×N WSS 500. In the top view plane, the lens 706 may be respectively separated from the 2D FAU 402 and the first beam steering device 506 by a focal length of the lens 706, which may cause the optical beam angle at the first beam steering device 506 to be transformed to an optical beam with a lateral offset at the 2D FAU 402. In some implementations, the lens 704 may be separated from the 2D FAU 402 by a focal length of the lens 704; the lens 704 may be separated from the lens 706 by a sum of the focal length of the lens 704 and a focal length of the lens 706; and the first beam steering device 506 may be separated from the lens 708 by the focal length of the lens 708. This may cause imaging of vertical offset at the first beam steering device 506 to be maintained at the 2D FAU 402 in the side view plane.

As indicated above, FIG. 7 is provided as an example. Other examples may differ from what is described with regard to FIG. 7.

Figure 8:
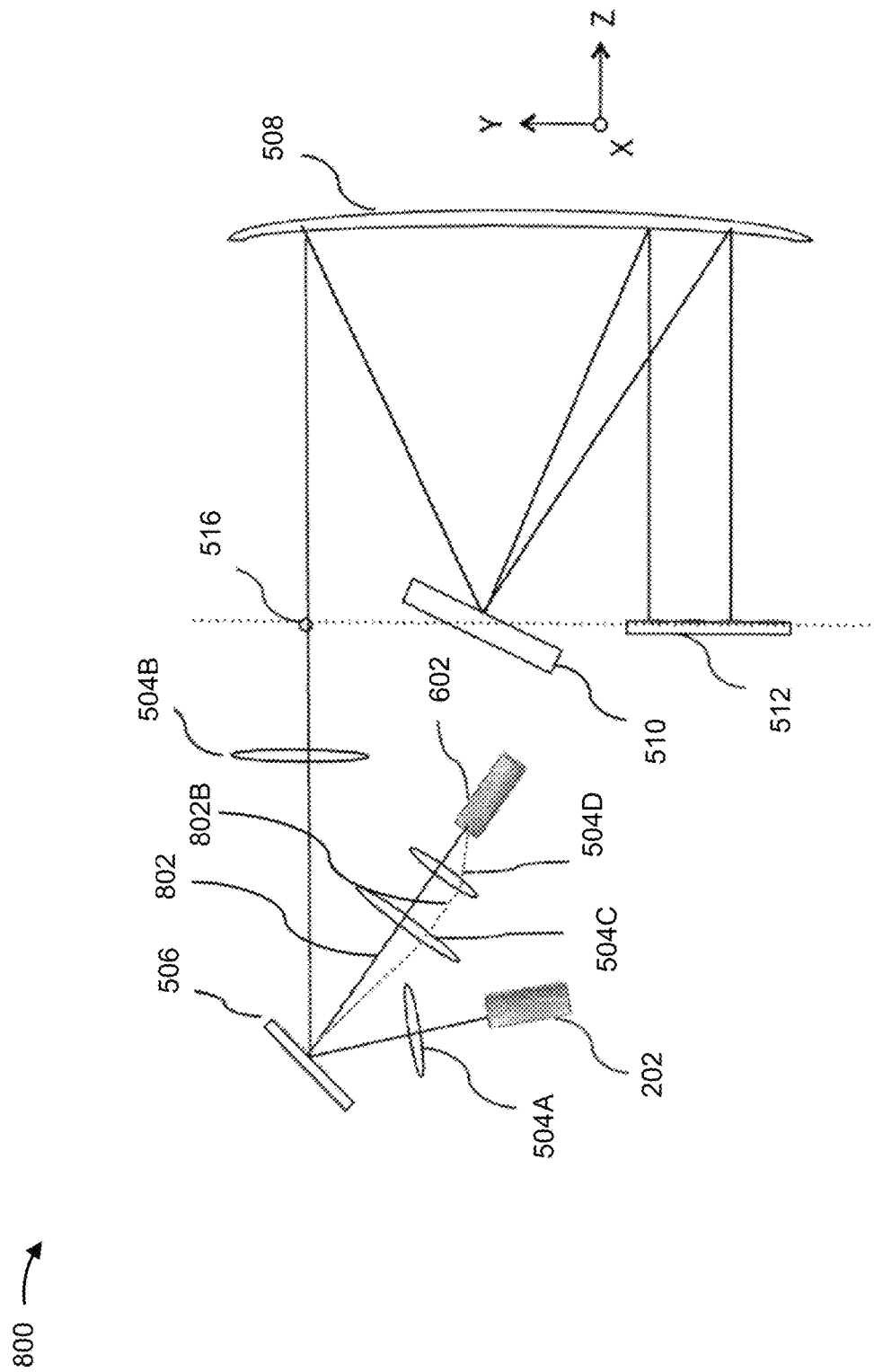
FIG. 8 is a diagram illustrating a top view of an example alternative layout of the example M×N WSS described herein.

FIG. 8 is a diagram illustrating a top view of an example alternative layout 800 of the M×N WSS 500, where the 2D input FAU 502 is replaced with the 1D FAU 202 and the 1D output FAU 514 is replaced with the 1D FAU 602. The remaining elements of the M×N WSS 500 are the same. In a similar manner as that described herein in relation to FIG. 5, a mirror of the first beam steering device 506 (e.g., a MEMS mirror) may be enabled to tilt (e.g., around the X-axis), which may allow an angle of incidence of an optical beam reflected by the mirror to be adjusted toward an add/drop port optical fiber of the 1D FAU 602 (e.g., in the YZ plane). For example, the mirror may be tilted (e.g., around the X-axis) so that the first optical beam 516 may be steered along ray path 802 associated with a first add/drop optical fiber of the 1D FAU 602 (e.g., of the plurality of port optical fibers 606) or ray path 802B associated with a second add/drop port optical fiber of the 1D FAU 602 (e.g., of plurality of port optical fibers 606B) to allow for selective coupling to add/drop port optical fibers of the 1D FAU 602.

As indicated above, FIG. 8 is provided as an example. Other examples may differ from what is described with regard to FIG. 8.

Figure 9:
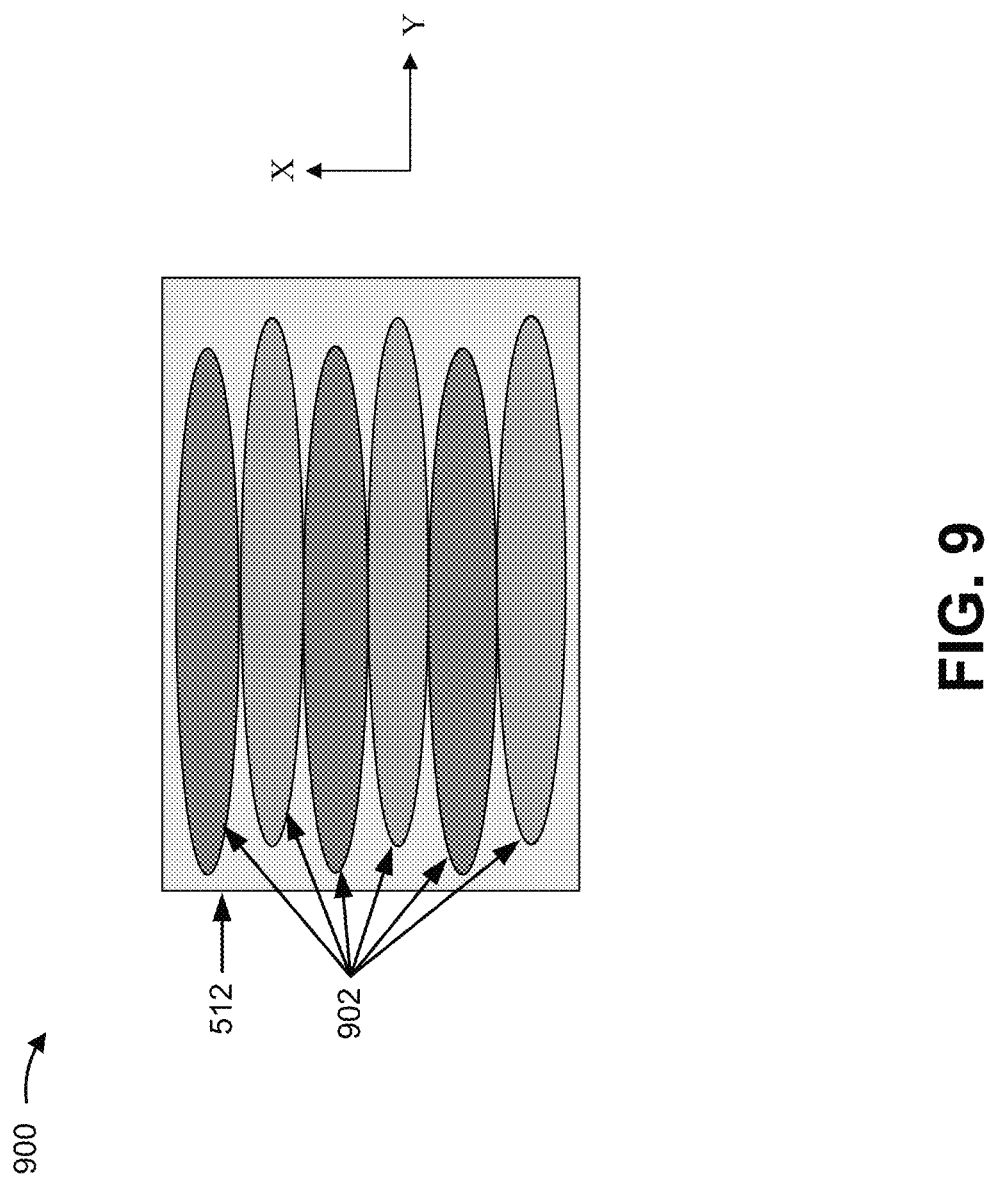
FIG. 9 is a diagram of example optical beams projected on a second beam steering device of the example M×N WSS described herein.

FIG. 9 is a diagram 900 of example optical beams projected on the second beam steering device 512 of the M×N WSS 500 described herein. As shown in FIG. 9, when the 2D FAU 402 or the 1D FAU 602 is used as the input FAU of the M×N WSS 500, a plurality of spectrally dispersed beams 902 (shown as six spectrally dispersed beams) may be projected on the second beam steering device 512 in a lateral offset pattern. For example, a first beam (e.g., the top beam of beams 902) may be centered at a first position along the Y-axis shown in FIG. 9 (e.g., indicated by a dark shading), a second beam (e.g., the second topmost beam of beams 902) may be centered at a second position along the Y-axis (e.g., indicated by a light shading), a third beam (e.g., the third topmost beam of beams 902) may be centered at the first position along the Y-axis (e.g., indicated by the dark shading), a fourth beam (e.g., the fourth topmost beam of beams 902) may be centered at the second position along the Y-axis (e.g., indicated by the light shading), and so on.

In some cases, the Y-axis on the second beam steering device 512 corresponds to channel frequency and therefore a shift in position of a beam 902 may be described as a frequency shift. When a frequency shift exists between two adjacent beams 902 that overlap, light associated with a first beam 902, of the two adjacent beams 902, will have a different frequency than light associated with a second beam 902, of the two adjacent beams 902, and thus will be rejected by the diffraction grating 510 when reflected back to an associated add/drop port optical fiber of the output FAU that is configured to receive the second beam 902. Accordingly, using the 2D FAU 402 or the 1D FAU 602 as the input FAU of the M×N WSS 500 may create a lateral offset pattern of beams 902 on the second beam steering device 512 that reduces or eliminate crosstalk issues (e.g., as described herein in relation to FIGS. 3A and 3B).

As indicated above, FIG. 9 is provided as an example. Other examples may differ from what is described with regard to FIG. 9.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

While some implementations are described herein in regard to port optical fibers, implementations include any type of optical conduit, such as planar waveguide.

Some implementations are described herein with regard to particular lenses, microlenses, and/or the like that modify an angle or position of an optical beam. It will be apparent that implementations described herein may use different arrangements of optical elements (e.g., lenses, mirrors, refractive devices, diffractive devices, and/or the like) to perform the same or similar functionality.

Some implementations are described herein with regard to particular beam steering devices performing beam steering functions, but implementations described herein may use different and/or additional beam steering technologies, such as MEMS mirror arrays, LCOS phased arrays, tiltable mirrors, controllable diffractive elements, controllable refractive elements, and/or the like, to perform the same or similar functionality.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An M×N wavelength selective switch (WSS), comprising:
   a common port fiber array unit (FAU) configured to emit optical beams with a lateral offset, comprising:
      a first set of common port optical fibers arranged in a first column of the common port FAU, and
      a second set of common port optical fibers arranged in a second column of the common port FAU,
         wherein the second column of the common port FAU is laterally offset from the first column of the common port FAU;
   a beam steering device configured to direct the optical beams with an angular offset to add/drop port optical fibers,
      wherein the beam steering device is configured to selectively direct, in two dimensions, the optical beams with the angular offset to the add/drop port optical fibers; and
   an optical element configured to converge the optical beams to a same area of the beam steering device at an angle to cause the angular offset.

2. The M×N WSS of claim 1, further comprising:
   an add/drop port FAU comprising the add/drop port optical fibers,
      wherein the add/drop FAU comprises a set of add/drop port optical fibers arranged in a column.

3. The M×N WSS of claim 1, further comprising:
   an add/drop port FAU, comprising:
      a first set of add/drop port optical fibers, of the add/drop port optical fibers, arranged in a first column of the add/drop port FAU, and
      a second set of add/drop port optical fibers, of the add/drop port optical fibers, arranged in a second column of the add/drop port FAU,
         wherein the second column of the add/drop port FAU is laterally offset from the first column of the add/drop port FAU.

4. The M×N WSS of claim 1, further comprising:
   a microlens array (MLA) coupled to the common port FAU,
      wherein the MLA comprises, for each of the first set of common port optical fibers and for each of the second set of common port optical fibers, a corresponding microlens, and wherein the MLA is configured to collimate the optical beams when exiting from the first set of common port optical fibers and the second set of common port optical fibers.

5. The M×N WSS of claim 1, further comprising:
a second optical element configured to convert the lateral offset of the optical beams into a second angular offset of the optical beams.

6. The M×N WSS of claim 1, further comprising:
a second optical element positioned between the common port FAU and the beam steering device,
wherein the second optical element is configured to convert the lateral offset of the optical beams into a second angular offset of the optical beams.

7. The M×N WSS of claim 1, wherein
the optical element is positioned between the beam steering device and an additional beam steering device.

8. An M×N wavelength selective switch (WSS), comprising:
a common port fiber array unit (FAU), comprising:
a first set of common port optical fibers and a second set of common port optical fibers arranged in a one-dimensional linear array of the common FAU,
wherein the first set of common port optical fibers and the second set of common port optical fibers are positioned alternatingly in the one-dimensional linear array of the common FAU;
a microlens array (MLA) coupled to the common port FAU, comprising:
a first set of microlenses and a second set of microlenses arranged in a one-dimensional linear array of the MLA,
wherein the first set of microlenses and the second set of microlenses are arranged in an alternating lateral offset pattern in the one-dimensional linear array of the MLA, and
wherein, the first set of microlenses are coupled to the first set of common port optical fibers and the second set of microlenses are coupled to the second set of common port optical fibers;
a beam steering device configured to selectively direct optical beams at an angular offset to add/drop port optical fibers of an add/drop port FAU; and
an optical element configured to converge the optical beams to a same area of the beam steering device at an angle to cause the angular offset.

9. The M×N WSS of claim 8, further comprising:
the add/drop port FAU,
wherein the add/drop FAU comprises a set of add/drop port optical fibers arranged in a one-dimensional array of the add/drop port FAU.

10. The M×N WSS of claim 8, further comprising:
the add/drop port FAU, comprising:
a first set of add/drop port optical fibers arranged in a first one-dimensional array of the add/drop port FAU, and
a second set of add/drop port optical fibers arranged in a second one-dimensional array of the add/drop port FAU,
wherein the second one-dimensional array of the add/drop port FAU is laterally offset from the first one-dimensional array of the add/drop port FAU.

11. The M×N WSS of claim 8, wherein the add/drop port FAU comprises a two-dimensional array of add/drop port optical fibers,
wherein the beam steering device is configured to tilt around an axis associated with a first dimension of the two-dimensional array and an axis associated with a second dimension of the two-dimensional array.

12. The M×N WSS of claim 8, wherein the common port FAU and the MLA are configured to emit a first set of optical beams, of the optical beams, interleaved with a second set of optical beams, of the optical beams,
wherein the first set of optical beams and the second set of optical beams have a second angular offset.

13. The M×N WSS of claim 12, wherein the beam steering device comprises at least one of:
a tilting micro-electro-mechanical system (MEMS) mirror array;
a liquid crystal on substrate (LCOS) phased array;
a tiltable mirror;
a controllable diffractive element; or
a controllable refractive element.

14. The M×N WSS of claim 12, further comprising:
a second optical element configured to converge the first set of optical beams and the second set of optical beams to a particular area of the beam steering device.

15. An M×N wavelength selective switch (WSS), comprising:
a laterally offset microcollimator array (MCA), comprising:
a one-dimensional fiber array unit (FAU) coupled to a laterally offset one-dimensional microlens array (MLA), or
a laterally offset two-dimensional FAU coupled to a laterally offset two-dimensional MLA;
a beam steering device, comprising:
one or more elements for selectively directing optical beams at an angular offset; and
an optical element configured to converge the optical beams to a same area of the beam steering device at an angle to cause the angular offset.

16. The M×N WSS of claim 15, wherein:
the one-dimensional FAU comprises:
a first set of port optical fibers and a second set of port optical fibers arranged in a one-dimensional linear array of the one-dimensional FAU,
wherein the first set of port optical fibers and the second set of port optical fibers are positioned alternatingly in the one-dimensional linear array of the one-dimensional FAU; and
the laterally offset one-dimensional MLA comprises:
a first set of microlenses and a second set of microlenses arranged in a one-dimensional linear array of the laterally offset one-dimensional MLA,
wherein the first set of microlenses and the second set of microlenses are arranged in an alternating lateral offset pattern in the one-dimensional linear array of the laterally offset one-dimensional MLA, and
wherein, the first set of microlenses are coupled to the first set of port optical fibers and the second set of microlenses are coupled to the second set of port optical fibers.

17. The M×N WSS of claim 15, wherein:
the laterally offset two-dimensional FAU comprises:
a first set of port optical fibers arranged in a first column of the laterally offset two-dimensional FAU, and
a second set of port optical fibers arranged in a second column of the laterally offset two-dimensional FAU,
wherein the second column of the laterally offset two-dimensional FAU is laterally offset from the first column of the laterally offset two-dimensional FAU; and the laterally offset two-dimensional MLA comprises:
- a first set of microlenses arranged in a first column of the laterally offset two-dimensional MLA, and
- a second set of microlenses arranged in a second column of the laterally offset two-dimensional MLA, wherein the second column of the laterally offset two-dimensional MLA is laterally offset from the first column of the laterally offset two-dimensional MLA.

18. The M×N WSS of claim 15, wherein the one-dimensional FAU and the laterally offset one-dimensional MLA are configured to emit or receive the optical beams with a lateral offset.

19. The M×N WSS of claim 15, wherein the laterally offset two-dimensional FAU and the laterally offset two-dimensional MLA are configured to emit or receive a first set of optical beams, of the optical beams, interleaved with a second set of optical beams, of the optical beams.

20. The M×N WSS of claim 15, further comprising:
- an additional MCA configured to emit or receive the optical beams,
  - wherein the additional MCA comprises one of the following:
    - a one-dimensional first additional FAU coupled to a non-laterally offset one-dimensional additional MLA,
    - a one-dimensional second additional FAU coupled to a laterally offset one-dimensional additional MLA, or
    - a laterally offset two-dimensional additional FAU coupled to a laterally offset two-dimensional additional MLA.

* * * * *